United States Patent
Daoud

(10) Patent No.: US 6,252,941 B1
(45) Date of Patent: Jun. 26, 2001

(54) NETWORK INTERFACE UNIT

(75) Inventor: Bassel H. Daoud, Parsippany, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/064,899

(22) Filed: Apr. 23, 1998

(51) Int. Cl.[7] ............................. H04M 1/24; H01R 24/06
(52) U.S. Cl. .......................... 379/19; 379/399; 439/676
(58) Field of Search ................................ 379/21, 27, 29, 379/399, 412, 19; 439/409, 417, 676

(56) References Cited

U.S. PATENT DOCUMENTS

| | | | | |
|---|---|---|---|---|
| 4,580,009 | * | 4/1986 | Darland | 379/443 |
| 4,799,251 | * | 1/1989 | Smith et al. | 379/21 |
| 5,004,433 | | 4/1991 | Daoud | 439/502 |
| 5,108,315 | * | 4/1992 | Vogl et al. | 439/651 |
| 5,144,657 | * | 9/1992 | Depaepe | 379/21 |
| 5,222,908 | | 6/1993 | Baker, III et al. | 439/557 |
| 5,240,432 | * | 8/1993 | Daoud | 439/417 |
| 5,312,266 | | 5/1994 | Daoud | 439/304 |
| 5,363,440 | | 11/1994 | Daoud | 379/399 |
| 5,487,675 | | 1/1996 | Daoud | 439/95 |
| 5,550,916 | | 8/1996 | Daoud | 379/399 |
| 5,687,213 | * | 11/1997 | Larkin | 379/21 |
| 5,993,243 | * | 11/1999 | Daoud | 439/409 |
| 5,993,264 | * | 11/1999 | Daoud | 439/676 |
| 5,993,265 | * | 11/1999 | Daoud | 439/676 |
| 6,039,578 | * | 3/2000 | Suffi et al. | 379/19 |

* cited by examiner

Primary Examiner—William R. Korzuch
Assistant Examiner—Martin Lerner
(74) Attorney, Agent, or Firm—Synnestvedt & Lechner LLP

(57) ABSTRACT

A method and apparatus for allowing each subscriber line pair to be individually tested at the interface between a telephone company's telecommunication network and a subscriber's network using a single RJ11 jack. The bridge apparatus includes a bridge assembly having an RJ11 jack electrically coupled to two screws. The two screws are also electrically coupled to two wires, respectively, the other ends of the wires being electrically connected to alligator clips. The alligator clips may be clipped onto any wire pair of a connector assembly within a BEP or telephone equipment box and thereby directly to any particular subscriber line pair, thus bypassing the subscriber network. This allows a subscriber to test any subscriber line pair in the box using only a single bridge assembly to determine whether a previously detected fault exists is within the telephone company's telecommunication network or within the subscriber's network.

29 Claims, 7 Drawing Sheets

NETWORK INTERFACE UNIT

FIELD OF THE INVENTION

The invention relates to telecommunications apparatus generally and to network interface units particularly. More particularly, the invention relates to network interface units of the type used in telecommunications applications to provide access to a telecommunications network.

BACKGROUND OF THE INVENTION

Telecommunication services are provided by telephone companies via telecommunications networks to which a subscriber (i.e., a customer) may connect its telephone or other telecommunications equipment. Recently, telephone companies have made a division between the equipment owned by the telephone company and that owned by the individual customers. The point at which the telephone company owned equipment (hereinafter the telephone network) and the customer owned equipment meet is herein termed the interface. The interface typically is enclosed in a box (hereinafter a telephone utility box) that is mounted to a wall in the basement of a building. Commonly, the box includes a building entrance protector (BEP) circuit and a network interface unit.

The telephone company owns all of the wires and equipment from the telephone company central office up to and including this telephone utility box and the equipment therein. The building owner owns and is responsible for all telephone wires and equipment in the building other than the telephone utility box. In apartments and office buildings, individual tenants, of course, typically own and are responsible for the telephone equipment within their rental space, such as individual telephones and modems. As referred to herein, the term "subscriber's network" refers to the telecommunications wiring infrastructure in a building, which is owned by the building owner and may include a single subscriber's or multiple subscribers' telecommunications wires and/or equipment. The term "subscriber" as used herein shall refer to an entity subscribing to telecommunications service provider (e.g., a local telephone company) whose telecommunications wires enter a building through a particular telephone utility box.

BEP's of the type heretofore known typically comprise a cable splice chamber and a protector field for providing electrical surge protection for each subscriber's telephone line pair. A telecommunications wire bundle from a telephone company leads into a splice chamber within the BEP. Each individual subscriber line includes two wires in the bundle, termed tip and ring. In the splice chamber, the wires are unbundled and electrically coupled to the surge protector field within the BEP. Wires leading from the surge protector are electrically coupled to the back ends of individual connectors in a connector assembly.

The connector assembly comprises an array of electrically-conductive connectors. It typically is an electrically insulative mounting block in which a plurality of electrically-conductive connectors are held in a standard predetermined relationship. One well-known example is a type-66 connector assembly. Examples of widely accepted connector assemblies are shown in U.S. Pat. Nos. 3,957,335 to Troy, U.S. Pat. No. 5,127,845 to Ayer et al. and U.S. Pat. No. 5,575,680 to Suffi.

The connectors terminate in terminals which may be used as connecting points, splice points or cross-connect points of a telephone company's telecommunications network. In telecommunications applications, such connector assemblies are commonly mounted on a panel in the BEP with the back ends of the connectors (the end behind the panel) coupled to the telephone company's telecommunications network through the surge protectors and splice box. The front ends of the connectors in the connector assembly are coupled to the network interface unit by jumper cables.

The network interface unit enables a subscriber to test a telephone line at the interface of the telephone company's telecommunications network and the subscriber's network, thereby bypassing the subscriber's network and testing only the telephone company's telecommunications network. This way, the subscriber can very quickly determine if a problem with a line pair exists either in the telephone company's network or its own. A typical network interface unit of the prior art is disclosed in U.S. Pat. No. 5,363,440 to Daoud, incorporated herein by reference, and is illustrated in FIG. 1 hereof.

FIG. 1 shows an exemplary network interface unit of the prior art. The network interface units of the type heretofore known include an array of interfaces 10 mounted within respective openings in a chassis 11. There is one interface 10 for each subscriber line pair. Each interface 10 includes a connector portion 12 which comprises a pair of screws 13 and 14 electrically coupled to the customer's equipment by means of wires (tip and ring for single subscriber line; not shown). These wires are owned by the building owner and are part of the subscriber's network. These wires are routed through the building to a telephone jack to which a telephone (or other telecommunications equipment) is coupled. Screws 13 and 14 also are coupled to a pair of wires (also not shown in FIG. 1) within a telephone cable 15 which emerge from the body of the connector 12. The other end of telephone cable 15 terminates in a standard RJ11 plug 16.

Adjacent to each connector portion 12, is a bridge assembly 17 which includes an RJ11 jack 18 for receiving the RJ11 plug 16. Jack 18 is electrically coupled via jumper wires (not shown) to connectors in the connector assembly of the BEP (not shown) and therethrough to the telecommunications network as previously described. A bridge of the prior art is disclosed in U.S. Pat. No. 5,004,433 to Daoud, which is incorporated herein by reference.

The network interface unit is embodied within a telephone equipment box 1 comprising a base member 19, a cover 21, and a hinge 20 coupling the cover to the base member. The box 1 may be mounted to a wall in the basement of a building. Commonly, the aforementioned BEP is included within the box 1 and may be positioned behind the network interface unit chassis. Accordingly, a subscriber line in the subscriber's network is coupled to the telephone company's telecommunication network at the network interface unit by plugging RJ11 plug 16 into jack 18.

In the event that a subscriber finds his telephone line to be inoperative, he or more likely a superintendent of the building may open the telephone equipment box and find the connector/bridge unit corresponding to the resident's telephone line. The superintendent could then uncouple the corresponding plug 16 from the mating jack 18 and connect the RJ11 plug of a working telephone directly into jack 18, thus bypassing the subscriber's entire network. If the superintendent obtained no dial tone, he or she could conclude that the problem with the subscriber line in question was within the telephone company's telecommunication network and could refer the problem to the local telephone company. However, if the superintendent discerned a dial tone, he could conclude that the problem was within the subscriber's network and, therefore, not the responsibility of the telephone company.

Since a connector/bridge combination unit is provided for each subscriber line pair, the network interface unit can be quite large, particularly, in a large apartment or office building.

In older buildings, the interface between the telephone company's telecommunication network and the subscriber network may not even have a network interface unit as described above which would allow the subscriber to easily determine on his own in which portion of the system the problem lies. Rather, when a subscriber finds his telephone line to be inoperative, a telephone company technician must be dispatched in order to test the telephone line at the interface between the telecommunication network and the subscriber's network.

Without a network interface unit as described above, the technician typically first taps into the connector pair on the BEP's connector assembly to which the subscriber's telephone line was connected. In order to tap into tip and ring terminals on a connector assembly of a BEP, the technician uses a specially adapted handset. The handset has a pair of wires terminating in alligator clips to facilitate such tapping. Alternately, the handset might have a pair of wires terminating in conductive test probes.

As before, if the technician discerned no dial tone, he could conclude that the problem was with the telephone company's telecommunication network. However, if the technician obtained a dial tone, the problem was within the subscriber's network and, therefore, not the responsibility of the telephone company. In the latter case, the technician had been dispatched unnecessarily at considerable cost to the telephone company or the subscriber.

Accordingly, it is an object of the present invention to provide a method and apparatus for retrofitting a BEP to allow a subscriber to easily determine whether the inoperability of his telephone is due to a fault in the telephone company's telecommunication network or in the subscriber's network.

It is another object of the present invention to provide an apparatus for allowing a subscriber to easily test a telephone line pair at the interface between the telephone company's telecommunication network and the subscriber's network which occupies minimal volume and is inexpensive.

It is a further object of the present invention to provide a network interface unit of reduced volume and complexity which allows each individual line pair in a telephone equipment box to be tested individually.

SUMMARY OF THE INVENTION

In accordance with the present invention, a network interface unit is provided comprising a single bridge assembly which can be readily coupled to any line pair on a connector assembly of a BEP. Accordingly, any line pair in a telephone equipment box can be tested without the need for a bridge unit for each individual line pair.

In a preferred embodiment of the invention, a bridge unit comprises first and second screws to which first and second tapping wires are respectively coupled. The opposite ends of the tapping wires terminate in first and second alligator clips, respectively. The bridge assembly also includes a two connector RJ11 jack, the two connectors of which also are electrically coupled to the first and second screws, respectively.

When a subscriber discovers that his telephone cannot obtain a dial tone, he can open the telephone equipment box and plug an operational telephone into the RJ11 jack provided on the single bridge unit. He can then find the tip and ring pair on the connector assembly corresponding to the subscriber line in question and couple the first and second alligator clips, respectively, thereto. He can then pick up the receiver on the telephone to determine whether a dial tone is being received. If so, then the problem in the connection is in the subscriber's network. If no dial tone is discerned, then the problem is known to be in the telephone company's telecommunication network.

In one embodiment of the invention, the bridge unit is mounted within an opening in the BEP panel within the telephone equipment box. In a second embodiment particularly adapted for retrofitting older boxes which do not have network interface units, the bridge unit is carried on a mounting assembly which can be mounted right onto the face of a BEP panel such that the entire bridge unit is essentially suspended above the panel. The mounting assembly can be provided with double sided tape for simply adhering the mounting assembly and bridge to the panel. The mounting unit alternately may be fixed to the panel by one or more screws.

In a further preferred embodiment of the invention, wire retaining clips are provided on the bridge unit such that the tapping wires which terminate in the alligator clips can be wound around the two pins for storage when not in use.

DETAILED DESCRIPTION OF THE INVENTION

Figure 1:
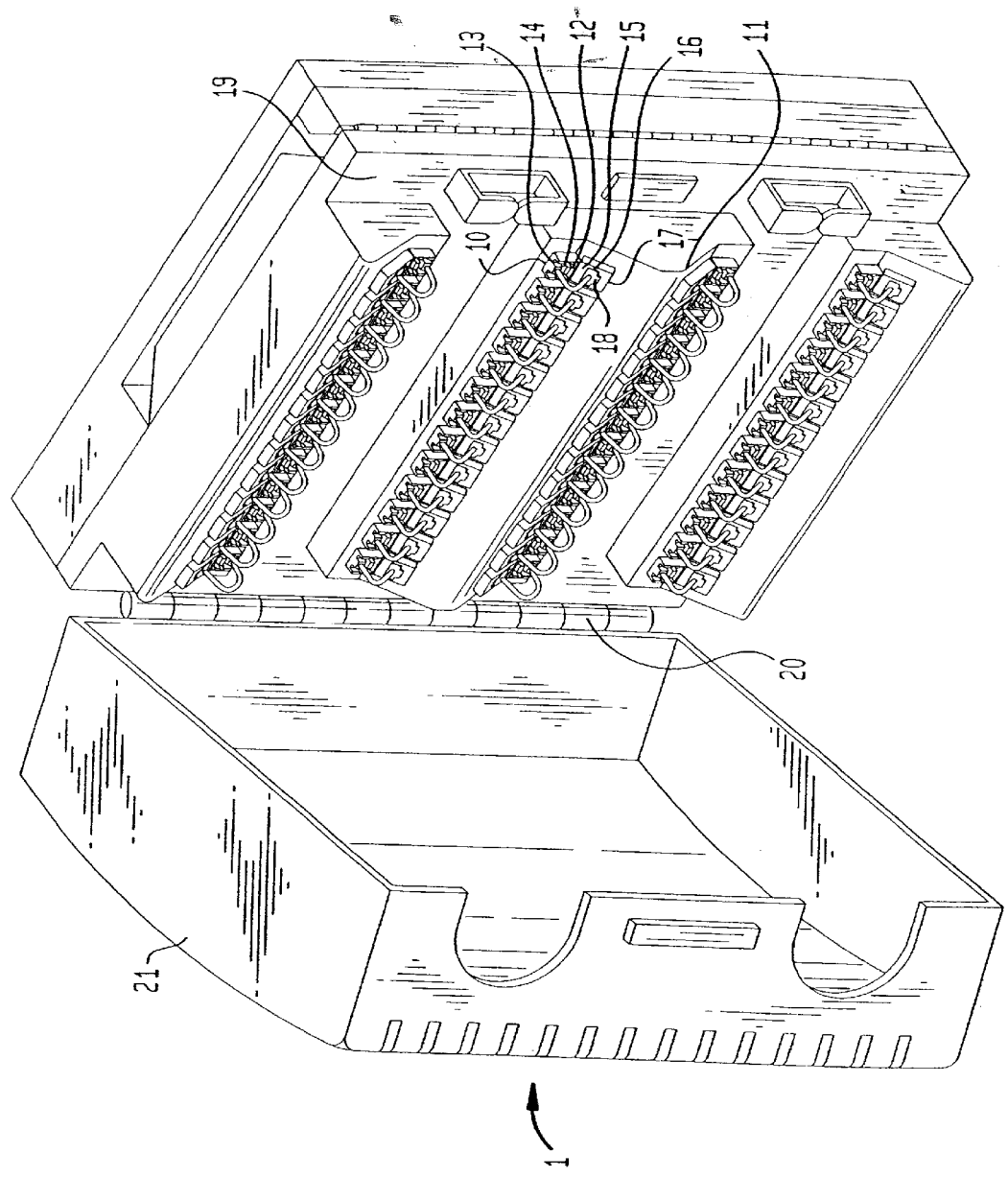
FIG. 1 is a perspective view of a network interface unit in accordance with the prior art.
Figure 2:
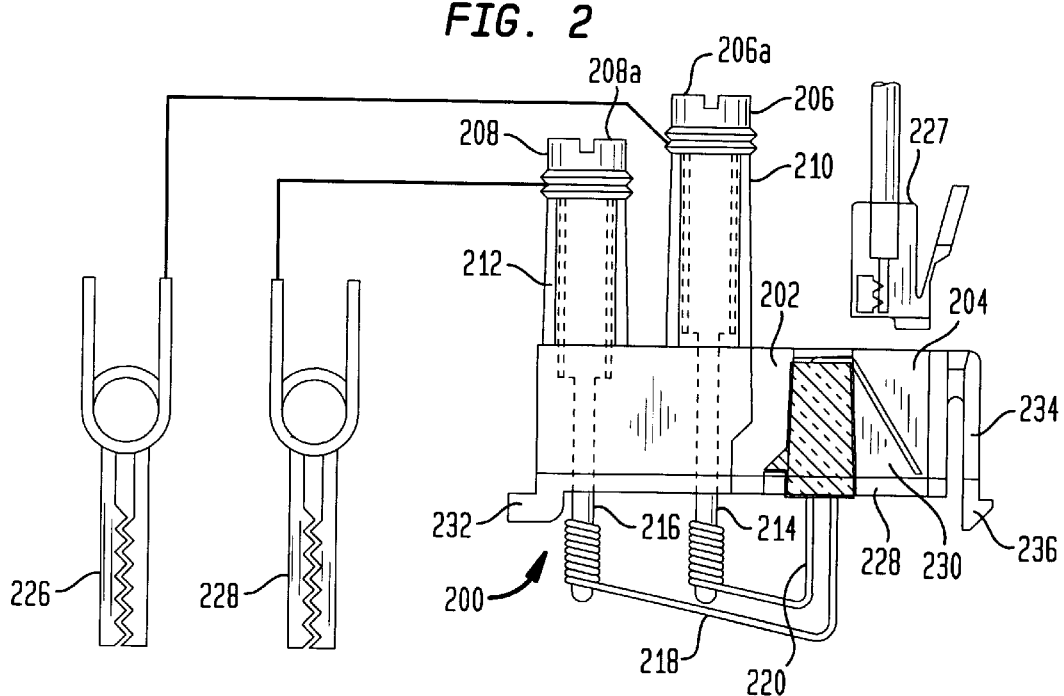
FIG. 2 is a side view of a network interface unit bridge assembly in accordance with the present invention.
Figure 3:
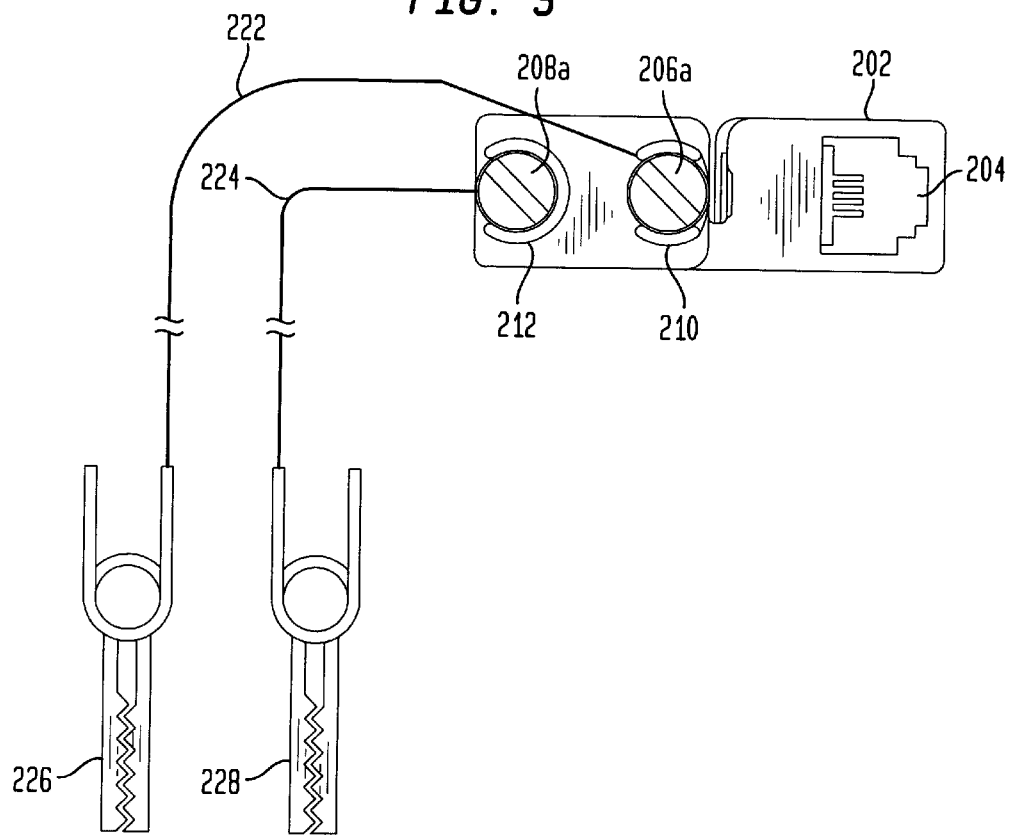
FIG. 3 is a plan view of a network interface unit bridge assembly in accordance with the present invention.

FIGS. 2 and 3 are plan and top views, respectively, of a bridge unit 200 constructed in accordance with a preferred embodiment of the present invention. The bridge unit 200 includes a housing 202 enclosing an RJ11 jack 204. The housing may be formed of a polycarbonate material. First and second threaded screws 206 and 208 pass into screw receptacles 210 and 212 mounted within the housing 202. The screws and the screw receptacles are made of an electrically conductive material such as aluminum, copper or brass coated steel. The screw receptacles 210 and 212 are electrically coupled to pins 214 and 216 which protrude from the bottom of the housing 202. Wires 218 and 220 are coupled between pins 214 and 216 and first and second electrical contacts (not shown), respectively, in RJ11 jack 204. As shown in FIG. 3, the ends of two tapping wires 222 and 224 are wrapped around the proximal ends of screws 206 and 208. The screws are then screwed down into screw receptacles 210 and 212 so as to trap the tapping wires between the screw heads 206a and 208a and the top of the screw receptacles 210 and 212. The other ends of the tapping wires 222 and 224 are coupled to respective first and second alligator clips 226 and 228. Accordingly, there is a continuous electrical path from each alligator clip to one of the two electrical contacts in the RJ11 jack 204.

Figure 4:
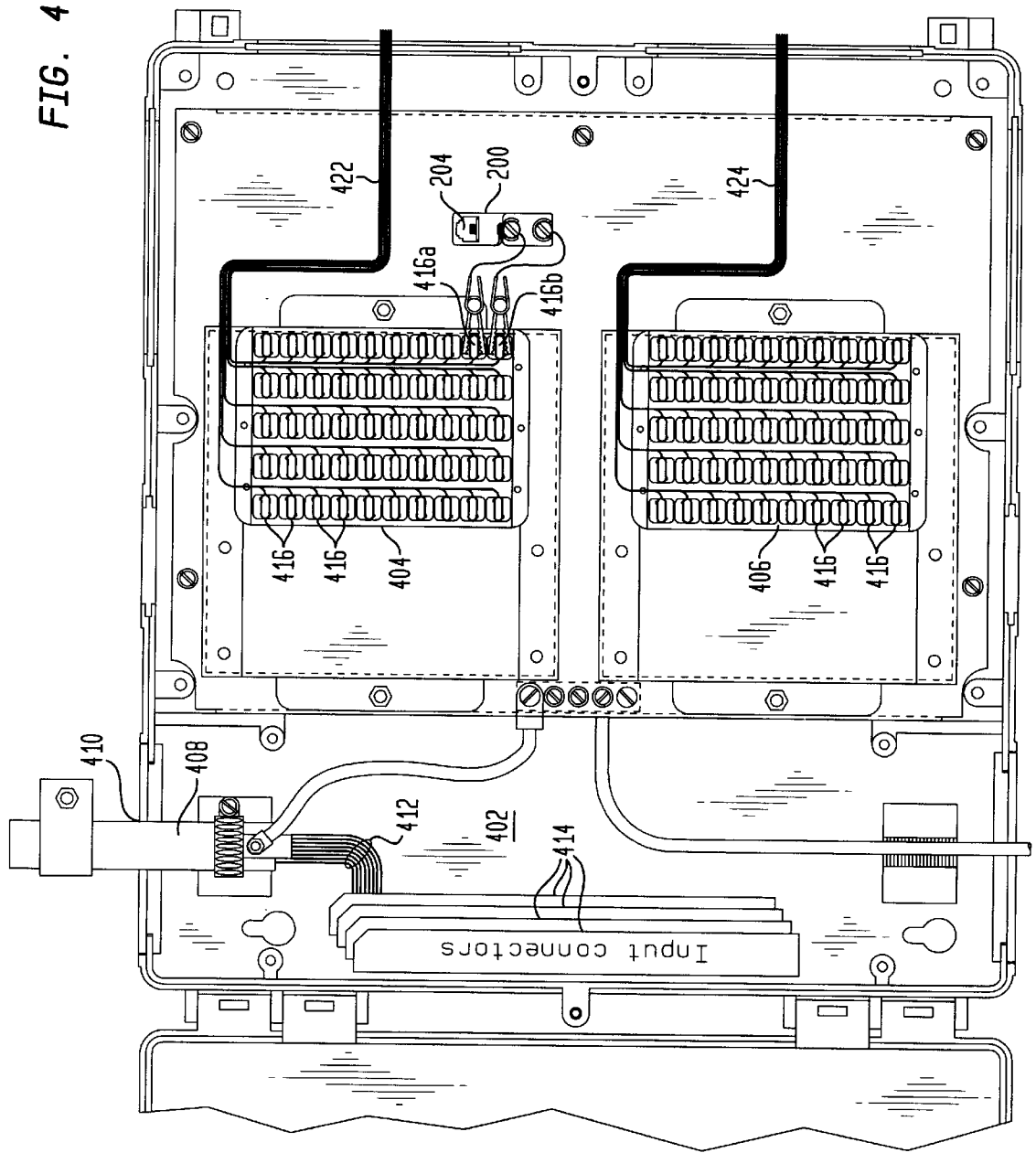
FIG. 4 is a plan view of a portion of a telephone equipment box in accordance with the present invention.

Referring now to FIG. 4, which shows an exemplary panel 400 in a telephone equipment box 401 constructed in accordance with the present invention, the bridge unit 200 is mounted on panel 400 as will be described in further detail below. Panel 400 includes a splice box 402 and two connector assemblies 404 and 406. A telephone cable bundle 408 enters the splice box 402 through an opening 410 in the top of the box. The individual wires 412 are unbundled and electrically connected to terminals on input connectors 414. Jumper wires which cannot be seen in FIG. 4 run from the input connectors 414 behind the panel to a BEP array (also behind the panel) which typically comprises a series of surge protectors. Jumper wires then run from the surge protectors to the various connectors 416 contained in the connector assemblies 404 and 406. The connectors 416 are conductive metal stakes mounted in connector assemblies 404 and 406 and which pass through the connector assemblies 404 and 406 and panel 400 from the front surface (seen in FIG. 4) to the back surface. Tip and ring wire pairs for a single subscriber line are typically coupled to two adjacent connectors 416. In the embodiment shown in FIG. 4, tip and ring of a single line pair are vertically adjacent. However, it is also common for tip and ring of a single line pair to be coupled horizontally adjacent connectors or a connector assembly 404 or 406.

Wire bundles 422 and 424 comprising the wires of the subscriber's network leading to various telecommunications equipment located throughout the building are routed to the connector assemblies 404 and 406 for coupling into the telephone company's telecommunications network. Individual wires in bundles 422 and 424 are coupled to individual stakes 416 in the connector arrays 404 and 406, for example, by pin and socket type connectors to couple the subscriber lines in the subscriber's network to subscriber lines of the telephone company's telecommunications network.

In operation, when a subscriber determines that the telephone unit in his apartment is not working properly, he may quickly and easily determine whether the problem lies in the telephone company telecommunications network (the equipment and wires coupled between the telephone equipment box 401 and the telephone central office) or in the subscriber network (the equipment and wires coupled between his telephone and the telephone equipment box 401). Particularly, a subscriber may open the box 401 to expose the panel 400 as shown in FIG. 4. The subscriber then may determine which two adjacent connectors correspond to the tip and ring of the telephone line in his apartment. Commonly, the connectors will be labeled to indicate the particular apartment (and line number if the apartment has more than one telephone line pair) so that the subscriber may easily determine the connector corresponding to the line pair in question. He then couples the first and second alligator clips to the appropriate connectors, for example connectors 416a and 416b in FIG. 4, respectively, so as to electrically couple the bridge to the single line pair in question. The subscriber then plugs in the standard RJ11 plug (see 227 in FIG. 2) of a telephone (or any other communication equipment designed to be coupled to a telephone line) which he knows to be operational into the RJ11 jack 204 on the bridge. Most likely, the subscriber will simply unplug the non-working telephone (or other piece of telecommunication equipment) from the jack in his apartment and bring it with him to box 401. The telephone will now be directly coupled to the appropriate tip and ring lines of the telephone company's telecommunication network, bypassing the subscriber network.

If no dial tone is obtained on that telephone, then the problem is known to be in the telephone company's telecommunication network. On the other hand, if a dial tone is obtained, then the problem is known to be in the subscriber's network.

In accordance with the present invention, only a single bridge assembly need be provided in the telephone equipment box in order to allow testing of each and every line pair in the box.

Figure 5:
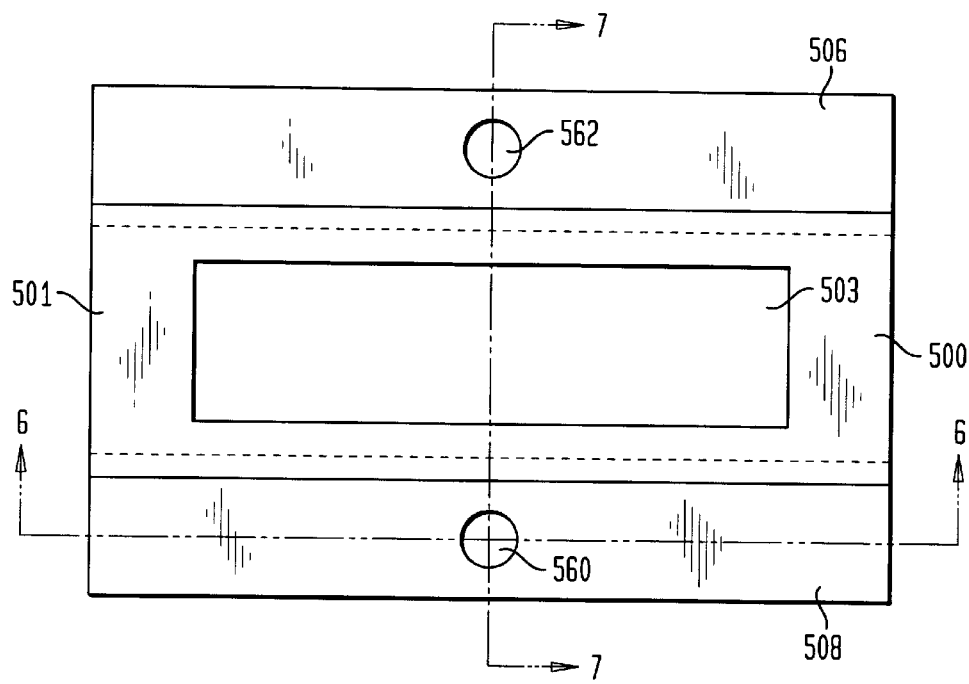
FIG. 5 is a plan view of an optional mounting unit for mounting the bridge of the present invention to a panel on an existing telephone equipment box.
Figure 6:
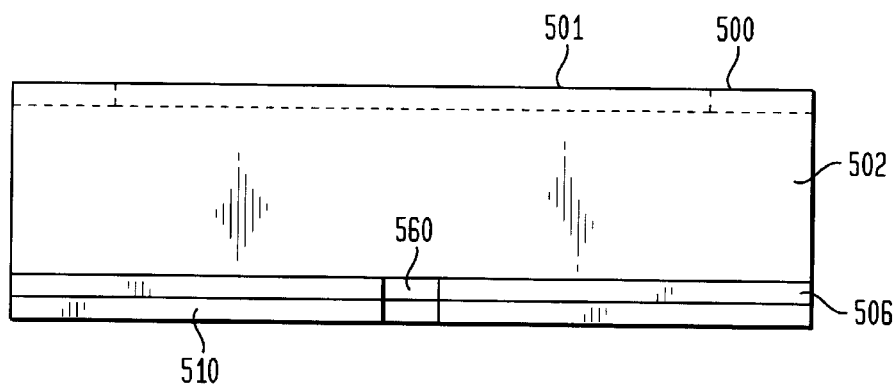
FIG. 6 is a cross-sectional side view of the mounting unit shown in FIG. 5 taken along line 6—6 in FIG. 5.
Figure 7:
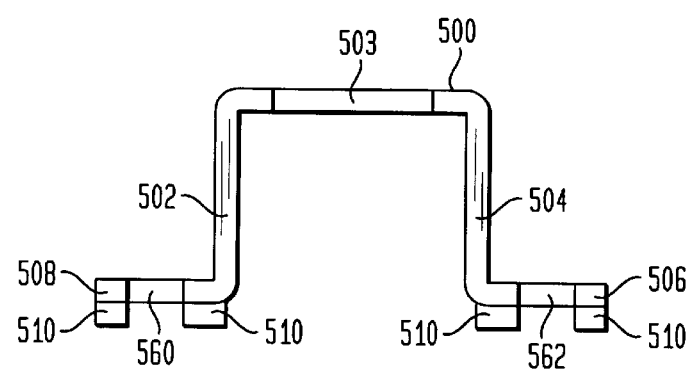
FIG. 7 is a cross-sectional end view of the mounting unit shown in FIGS. 5 and 6 taken along line 7—7 in FIG. 5.
Figure 8:
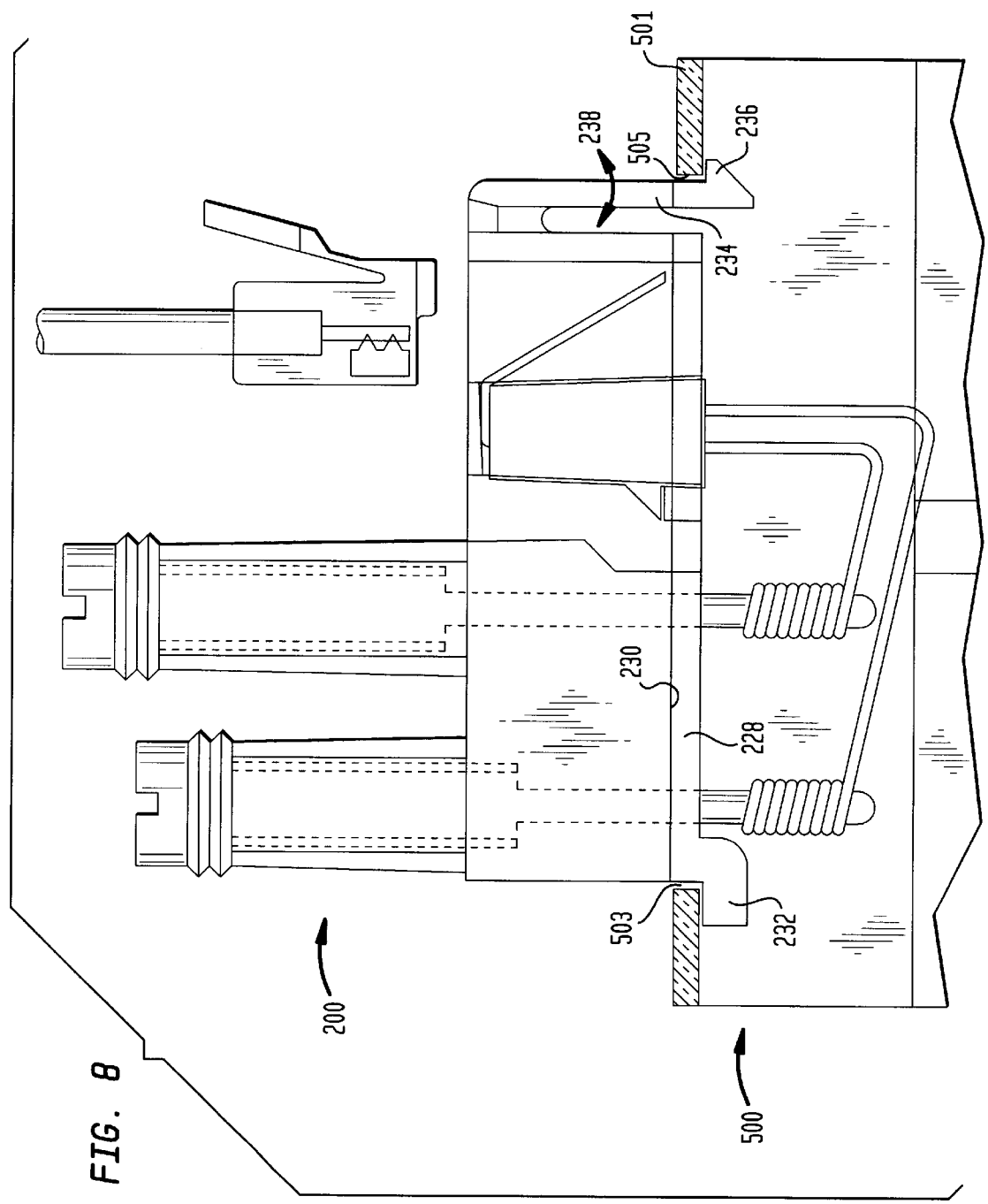
FIG. 8 is a cross-sectional plan view of the optional mounting unit shown in FIGS. 5–7 with a bridge mounted therein in accordance with the present invention positioned therein.

In telephone equipment boxes originally manufactured in accordance with the present invention, the bridge may be mounted directly in an appropriately sized and shaped opening in the panel. However, in older boxes which do not have a network interface unit and which it is desired to retrofit in accordance with the present invention, a bridge in accordance with the present invention may be attached to the surface of the panel. FIG. 5 is a plan view of an exemplary mounting unit for mounting the bridge on a panel using double sided tape. FIG. 6 is a cross-sectional side view of the mounting unit shown in FIG. 5 taken along line 6—6 in FIG. 5. FIG. 7 is a cross-sectional end view of the mounting unit shown in FIGS. 5 and 6 taken along line 7—7 in FIG. 5. FIG. 8 is a side view showing a bridge mounted in the mounting device in accordance with the present invention.

The mounting device 500 includes a top surface 501, two parallel legs 502 and 504 extending perpendicular from the transverse ends of the top surface, and two flanges 506 and 508 extending outwardly from the opposite ends of the legs parallel to the top surface. The top surface 501 includes an opening 503 for accepting a bridge unit 200. Double sided tape 510 is adhered to the bottom surfaces of the flanges 506 and 508. One side of the tape 501 is adhered to the flanges 506 and 508. The other side also carries adhesive which, prior to mounting, is covered by a film which can be peeled off to expose the adhesive on the opposite side when the unit is ready to be mounted to a panel. In order to mount the mounting unit 500 to a panel, the film is peeled away to expose the adhesive on the bottom side of the tape 510 and the mounting unit is simply pressed onto the panel in the desired location.

The mounting device is conveniently provided with circular openings 560 and 562 in flanges 506 and 508 in order to allow the mounting device 500 to be optionally screwed into a panel 400, if desired.

The opening 503 is sized and shaped to accept the bridge unit 200. As shown in FIG. 8, the bottom 228 of the bridge unit is generally rectangular in shape and is sized to fit within the opening 503. It includes a shoulder 230 extending along each transverse side which is larger than the opening 503. Accordingly, the shoulder 230 will rest on the edge of the opening 503 preventing the bridge unit 200 from falling through the opening 503. A flange 232 extends from one of the longitudinal ends of the bridge 200. At the other longitudinal end of the bridge 200 is a resilient member 234 including a dog 236. The resilient member 234 is resilient in the direction illustrated by arrow 238. Accordingly, in order to mount the bridge into the mounting device, the bridge is fitted within the opening by slipping flange 516 under the top surface 501 of the mounting device with the bridge 200 at an angle with the right side (FIG. 8) higher than the left side. Then, as the bridge is rotated clockwise generally about flange 232 into the opening 503, resilient member 234 flexes when dog 236 encounters edge 505 of the opening 503 to allow dog 236 to clear the edge 505 of the mounting device. Once the dog clears the edge, resilient member 234 snaps back out thus locking the bridge in the opening.

The bridge 200 is locked in the opening by flange 232 and dog 236 which prevent the bridge from being lifted out of the opening and by shoulders 230 which prevent it from dropping further into the opening. If necessary, the bridge can be removed from the mounting device simply be applying pressure on resilient member 234 in the left direction of double arrow 238, thus releasing the dog 236 and allowing the bridge 200 to be lifted out of the opening 503.

Figure 9:
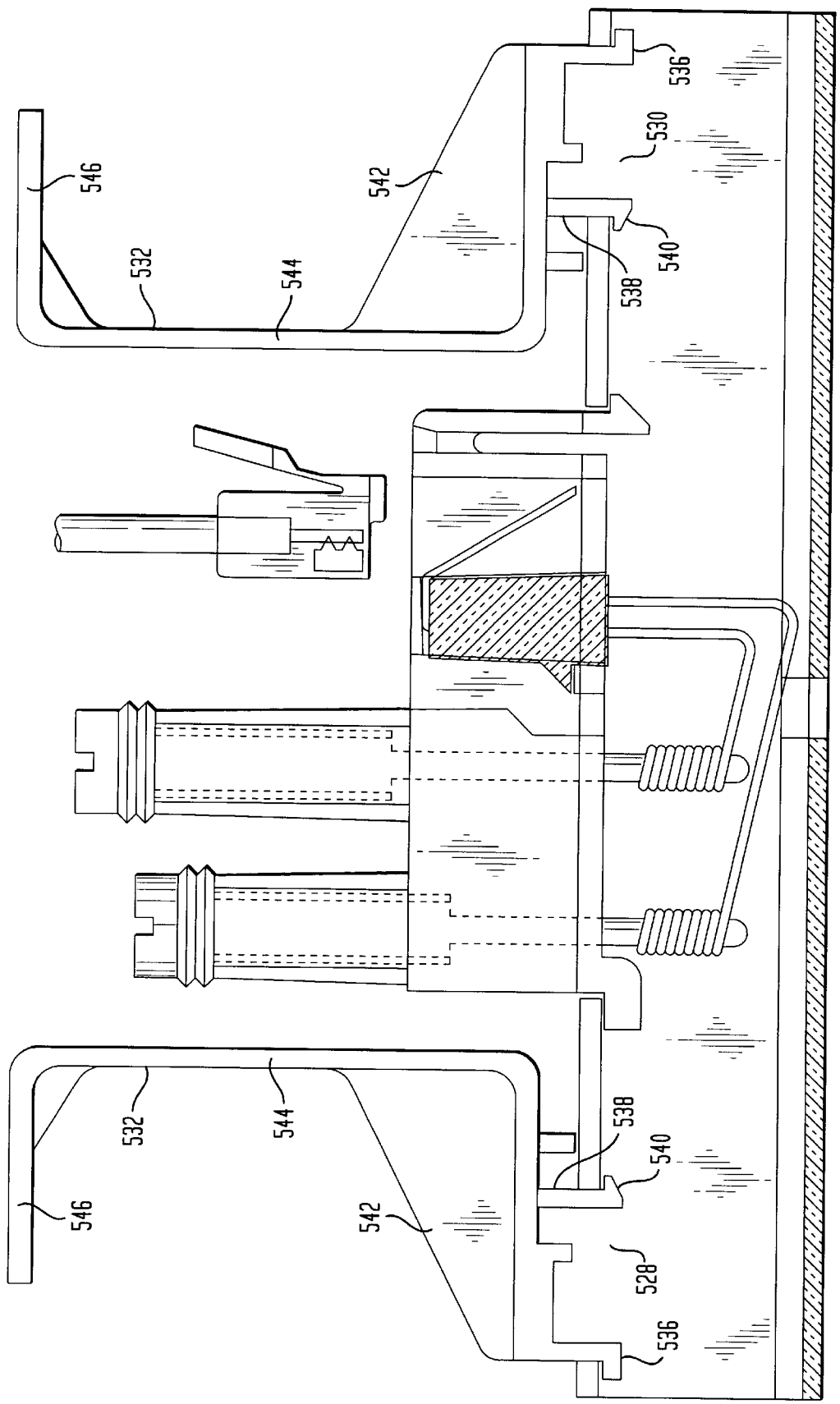
FIG. 9 is a plan view of a second embodiment of the bridge of the present invention including wire retaining clips.
Figure 10:
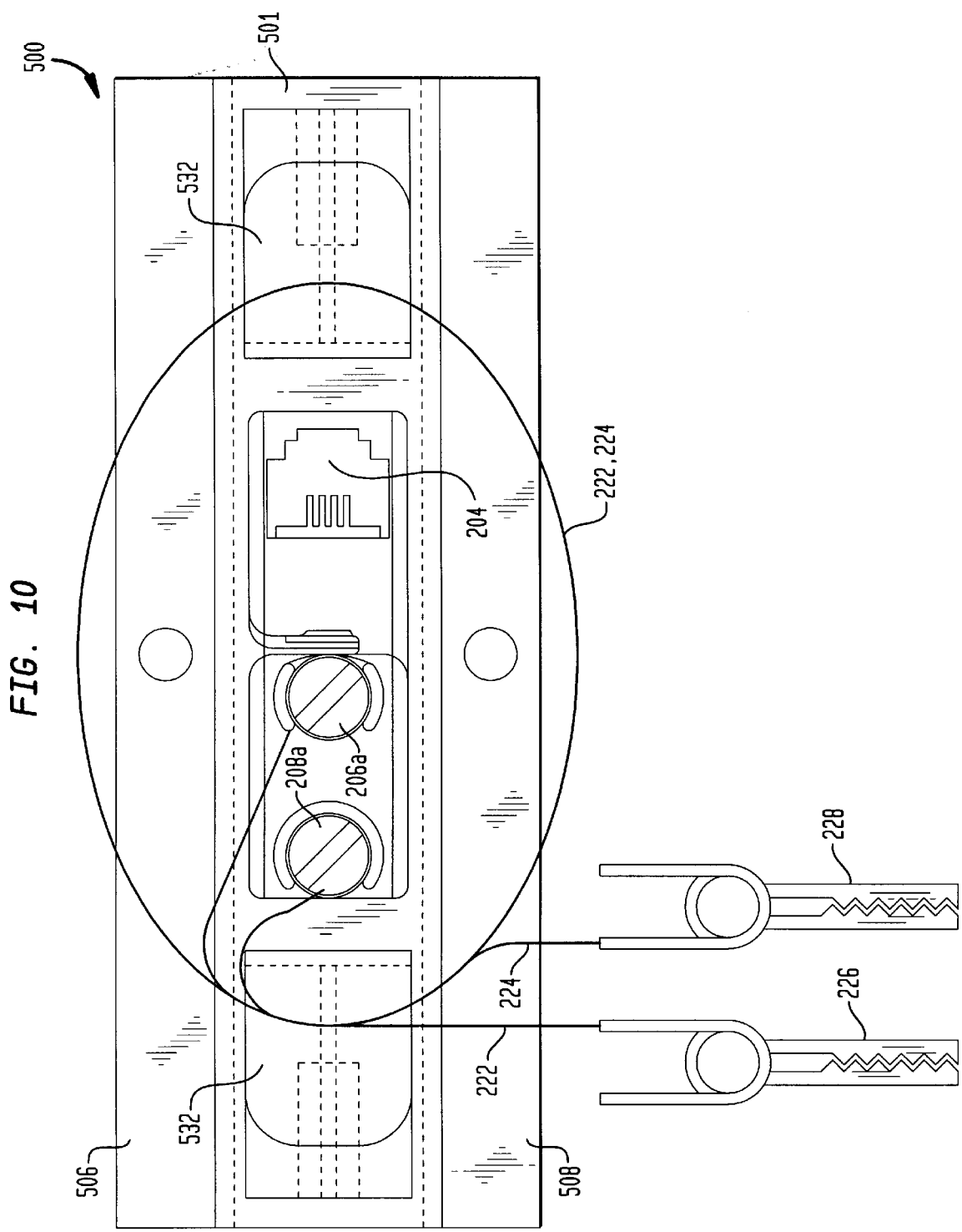
FIG. 10 is a top view of the second embodiment of the bridge of the present invention including wire retaining clips.

FIGS. 9 and 10 show plan and side views, respectively, of a bridge assembly in accordance with a second preferred embodiment of the invention. As shown here, the mounting device 500 includes second and third openings 528 and 530 on the top surface 501 of the mounting device. These openings are designed to accept wire retaining clips 532. Wire retaining clips 532 can be fixed within openings 528 and 530 by use of flanges 536, resilient members 538 and dogs 540 in a manner similar to that described above in connection with FIGS. 5–8 with respect to the mounting of the bridge 200 in the first top opening 503 in the mounting device. Wire retaining clips 532 each comprise leg members 542, 544, and 546. When the bridge is not in use, the tapping wires 222 and 224 and alligator clips 226 and 228 may remain connected to the screws as shown in FIG. 10 and the wires can be wound around the two wire retaining clips 532 to store the wire and alligator clips conveniently.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

What is claimed is:

1. An interface between a first communications network and a second communications network comprising:
    a plurality of communication wires of said first network;
    a plurality of communication wires of said second network;
    a connector array comprising a plurality of connectors for connecting communication wires of said first network to communication wires of said second network whereby communication can be established between individual communication wires of said first and second networks;
    a network interface device comprising;
        a jack adapted to accept a plug of a type used in connection with said second network for coupling a communications device to said second network, said jack including an electrical contact;
        an electrically conductive screw terminal electrically coupled to said jack; and
    whereby the integrity of said first network with respect to any particular communication wire of said first network can be tested by coupling a communications device into said jack and coupling said screw terminal to a connector in said connector array corresponding to said particular communication wire, thus bypassing said second network.

2. An interface as set forth in claim 1 wherein said networks are telecommunications networks and said communication wires of said first and second networks each comprise a pair of wires corresponding to tip and ring of a subscriber line pair.

3. An interface as set forth in claim 2 wherein said jack is an RJ11 jack and said plug is an RJ11 plug.

4. An interface as set forth in claim 3 further comprising:
    a splice box coupled between said plurality of wires of said first network and said connector assembly; and
    a building entrance protector circuit coupled between said splice box and said connector assembly comprising a surge protector corresponding to each subscriber line pair.

5. An interface as set forth in claim 4 wherein said connector assembly comprises a plurality of stakes, each stake having a wire of said first network and a wire of said second network coupled thereto.

6. An interface as set forth in claim 1 said network interface device further comprising:
    a tapping wire having a first end coupled to said electrical contact in said jack, said tapping wire having a second end adapted for coupling to said connectors in said connector array;
    a jumper wire coupling said electrical contact of said jack and said screw terminal; and
    wherein said first end of said tapping wire is coupled to said screw terminal.

7. An interface as set forth in claim 6 wherein said second end of said tapping-wire is electrically coupled to an alligator clip.

8. An interface as set forth in claim 7 wherein said alligator clip is sized and shaped to be clipped to an individual connector of said connector array.

9. An interface as set forth in claim 6 wherein said networks are, telecommunications networks and said communication wires of said first and second networks each comprise a pair of wires corresponding to tip and ring of a subscriber line pair.

10. An interface as set forth in claim 9 wherein said jack is an RJ11 jack and said plug is an RJ11 plug.

11. An interface between a first and a second communications network comprising:
    a panel;
    a plurality of communication wires of said first network;
    a plurality of communication wires of said second network;
    a connector array mounted on said panel, said connector array comprising a plurality of connectors for connecting communication wires of said first network to communication wires of said second network whereby communication can be established between individual communication wires of said first and second networks;
    a network interface device comprising;
        a housing;
        a jack included within said housing and adapted to accept a plug of a type used in connection with said second network for coupling a communications device to said second network, said jack including an electrical contact; and
        a tapping wire having a first end coupled to said electrical contact in said jack, said tapping wire having a second end adapted for coupling to said connectors in said connector array;

wherein said panel includes an opening sized and shaped to accept a bottom of said housing, said housing includes a shoulder adjacent said bottom of said housing, said shoulder shaped to prevent said housing from passing completely through said opening, a flange extending beyond said bottom of said housing and positioned on a side of said housing so as to engage an edge of said opening when said housing is positioned in said opening, and a resilient member carrying a dog positioned on a side of said housing opposite said flange, with said dog extending beyond said bottom of said housing and adapted for latching said network interface device in said opening in conjunction with said flange and said shoulder; and whereby the integrity of said first network with respect to any particular communication wire of said first network can be tested by coupling a communications device into said jack and coupling said screw terminal of said network interface device to a connector in said connector array corresponding to said particular communication wire, thus bypassing said second network.

12. An interface as set forth in claim 11 wherein said network interface device is adhesively mounted to said panel.

13. An interface as set forth in claim 11 wherein said housing is formed of a polycarbonate material.

14. An interface as set forth in claim 11 wherein said network interface device further comprises:

a pair of wire-retaining clips mounted on said panel, said clips being adapted to receive coils of said tapping wire.

15. An interface as set forth in claim 14 wherein said wire-retaining clips are formed on said housing.

16. An interface as set forth in claim 11 wherein said network interface device further comprises a pair of wire-retaining clips joined to said housing, said clips being adapted to receive coils of said tapping wires.

17. A network interface device for interfacing first and second networks, each network comprising a plurality of communication wire pairs, said interface comprising:

a housing;

a jack within said housing adapted to accept a plug of a type used in connection with said subscriber network for coupling a communications device to said second network, said jack including first and second electrical contacts; and first and second electrically conductive screw terminals;

first and second jumper wires coupled between said first and second electrical contacts in said jack and said first and second screw terminals, respectively; and first and second tapping wires, each having a first end coupled to said first and second screw terminals, respectively, said tapping wires each having a second end adapted for coupling to said connectors in said connector array;

whereby the integrity of said first network with respect to any particular pair of communication wires of said first network can be tested by coupling a communications device into said jack and coupling said tapping wire of said network interface device to a connector in said connector array corresponding to said particular communication wire, thus bypassing said second network.

18. An interface as set forth in claim 17 wherein said networks are telecommunications networks and said communication wire pairs of said first and second networks each comprise a tip and ring wire of a subscriber line pair.

19. An interface as set forth in claim 18 wherein said jack is an RJ11 jack and said plug is an RJ11 plug.

20. An interface as set forth in claim 19 wherein said second end of said tapping wire is electrically coupled to an alligator clip.

21. An interface as set forth in claim 20 wherein said housing has a bottom shaped to fit within an opening in a panel, said housing further including a shoulder adjacent said bottom of said housing, said shoulder shaped to prevent said housing from passing completely through said opening, a flange extending beyond said bottom of said housing and positioned on a side of said housing so as to engage an edge of said opening when said housing is positioned in said opening, and a resilient member carrying a dog positioned on a side of said housing opposite said flange with said dog extending beyond said bottom of said housing and adapted for latching said network interface device in said opening in conjunction with said flange and said shoulder.

22. An interface as set forth in claim 21 wherein said housing is formed of a polycarbonate material.

23. An interface as set forth in claim 17 further comprising a mounting unit for mounting said network interface device to an existing panel, said mounting unit comprising:

a surface having an opening for accepting said network interface unit;

a pair of legs extending perpendicularly from said surface; and a flange extending from each leg in a direction parallel to said surface.

24. An interface as set forth in claim 23 wherein said mounting unit is adhesively mounted to said panel via double sided tape adhered to said flanges.

25. An interface as set forth in claim 17 wherein said network interface device further comprises:

a pair of wire-retaining clips mounted on said panel, said clips being adapted to receive coils of said first and second tapping wires.

26. An interface between a telecommunications network and a subscriber's network comprising:

a plurality of tip and ring wire pairs of said telecommunications network;

a plurality of tip and ring wire pairs of said subscriber's network;

a connector array comprising a plurality of connectors for connecting said tip and ring wire pairs of said telecommunications network to said tip and ring wire pairs of said subscriber's network whereby communication can be established between individual tip and ring wire pairs of said telecommunications network and said subscriber's network; and a network interface device comprising;

an RJ11 jack including tip and ring electrical contacts;

first and second electrically conductive screw terminals coupled to said tip and ring electrical contacts, respectively; and first and second tapping wires, each having a first end coupled to said first and second electrically conductive screw terminals, respectively, and a second end electrically coupled to an alligator clip adapted to couple to the connectors in said connector array;

whereby the integrity of said telecommunications network with respect to any particular tip and ring pair can be tested by coupling a communications device into said jack and coupling said first and second tapping wires to first and second connectors of said connector array corresponding to a particular tip and ring wire pair of said telecommunications network, thus bypassing said subscriber's network.

27. An interface as set forth in claim 26 further comprising:

a splice box coupled between said plurality of tip and ring wires of said telecommunications network and said connector array; and a building entrance protector circuit comprising a surge protector corresponding to each tip and ring wire pair coupled between said splice box and said connector array.

28. An interface as set forth in claim 27 wherein said connector array comprises a plurality of stakes, each stake having a wire of said first network and a wire of said second network coupled thereto.

29. An interface as set forth in claim 26, said network interface device further comprising:

first and second jumper wires coupling said tip and ring electrical contacts in said jack to said first and second screw terminals, respectively.

\* \* \* \* \*